(12) United States Patent
Smyers (10) Patent No.: US 7,002,928 B1
(45) Date of Patent: Feb. 21, 2006

(54) IEEE 1394-BASED PROTOCOL REPEATER

(75) Inventor: Scott David Smyers, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1231 days.

(21) Appl. No.: 09/598,147

(22) Filed: Jun. 21, 2000

(51) Int. Cl.
H04L 12/28 (2006.01)
G06F 13/00 (2006.01)
G06F 13/36 (2006.01)

(52) U.S. Cl. .......... 370/257; 370/489; 370/502; 710/107; 710/112; 710/113

(58) Field of Classification Search .......... 370/257, 370/395.64, 468, 489, 502; 710/107, 108, 710/112–113, 117, 305, 313
See application file for complete search history.

(56) References Cited

U.S. PATENT DOCUMENTS

| | | | |
|---|---|---|---|
| 2,386,753 A | 10/1945 | Shield | 174/36 |
| 2,603,684 A | 7/1952 | Holmes | 174/106 |
| 3,785,432 A | 1/1974 | Kabat et al. | 165/22 |
| 4,376,920 A | 3/1983 | Smith | 333/12 |
| 4,604,689 A | 8/1986 | Burger | 364/200 |
| 4,761,519 A | 8/1988 | Olson et al. | 174/107 |
| 4,763,360 A | 8/1988 | Daniels et al. | 455/3 |
| 4,822,304 A | 4/1989 | Herron | 439/610 |
| 4,842,366 A | 6/1989 | Sawada et al. | 350/96.3 |
| 4,853,555 A | 8/1989 | Wheat | 307/9.1 |
| 4,871,883 A | 10/1989 | Guiol | 174/36 |
| 4,881,244 A | 11/1989 | Haug | 375/36 |
| 4,924,037 A | 5/1990 | Ainsworth et al. | 174/117 |
| 4,979,185 A | 12/1990 | Bryans et al. | 375/20 |
| 5,055,064 A | 10/1991 | Imaizumi et al. | 439/402 |
| 5,133,034 A | 7/1992 | Arroyo et al. | 385/107 |
| 5,162,609 A | 11/1992 | Adriaenssens et al. | 174/34 |
| 5,216,202 A | 6/1993 | Yoshida et al. | 174/36 |
| 5,216,204 A | 6/1993 | Dudek et al. | 174/102 |
| 5,244,415 A | 9/1993 | Marsilio et al. | 439/610 |
| 5,341,371 A | 8/1994 | Simpson | 370/85.4 |
| 5,362,249 A | 11/1994 | Carter | 439/357 |
| 5,400,340 A | 3/1995 | Hillman et al. | 370/105.3 |
| 5,412,697 A | 5/1995 | Van Brunt et al. | 375/360 |
| 5,418,478 A | 5/1995 | Van Brunt et al. | 326/86 |
| 5,483,656 A | 1/1996 | Oprescu et al. | 395/750 |
| 5,485,458 A | 1/1996 | Oprescu et al. | 370/85.2 |
| 5,485,488 A | 1/1996 | Van Brunt et al. | 375/257 |
| 5,493,657 A | 2/1996 | Van Brunt et al. | 395/308 |
| 5,499,344 A | 3/1996 | Elnashar et al. | 395/250 |
| 5,504,458 A | 4/1996 | Van Brunt et al. | 330/255 |

(Continued)

OTHER PUBLICATIONS

"1394 200 Mb/s PHYsical Layer Transceiver," IBM Microelectronics, Product Data Sheet and Application Notes, Version 1.4, Mar. 14, 1996.

(Continued)

*Primary Examiner*—Frank Duong
*Assistant Examiner*—Melanie Jagannathan
(74) *Attorney, Agent, or Firm*—Haverstock & Owens LLP (57) ABSTRACT

Systems and methods consistent with the present invention connect a remote device to a IEEE 1394-based network through an intervening telephone line, thereby enabling the remote device to recognize, discover and control devices on the IEEE 1394-based network. A protocol repeater converts signals on the telephone line into signals understood by the IEEE 1394-based network. The protocol repeater preferably is transparent to the remote device so the remote device thinks that it is directly connected to the 1394-based network.

18 Claims, 8 Drawing Sheets

U.S. PATENT DOCUMENTS

| | | | | |
|---|---|---|---|---|
| 5,504,757 | A | 4/1996 | Cook et al. | 370/84 |
| 5,527,996 | A | 6/1996 | Ham | 174/113 R |
| 5,572,658 | A | 11/1996 | Mohr et al. | 395/182.02 |
| 5,574,250 | A | 11/1996 | Hardie et al. | 174/36 |
| 5,579,486 | A | 11/1996 | Oprescu et al. | 395/200.15 |
| 5,592,510 | A | 1/1997 | Van Brunt et al. | 375/220 |
| 5,617,419 | A | 4/1997 | Christensen et al. | 370/471 |
| 5,619,544 | A | 4/1997 | Lewis et al. | 375/377 |
| 5,636,209 | A | 6/1997 | Perlman | 370/281 |
| 5,664,124 | A | 9/1997 | Katz et al. | 395/309 |
| 5,754,548 | A | 5/1998 | Hoekstra et al. | 370/402 |
| 5,781,028 | A | 7/1998 | Decuir | 326/30 |
| 5,796,042 | A | 8/1998 | Pope | 174/102 SP |
| 5,808,660 | A | 9/1998 | Sekine et al. | 348/8 |
| 5,881,249 | A | 3/1999 | Reasoner | 395/281 |
| 5,945,631 | A | 8/1999 | Henrikson et al. | 174/34 |
| 6,304,553 | B1 * | 10/2001 | Gehman et al. | 370/235 |
| 6,434,117 | B1 * | 8/2002 | Momona | 370/236 |
| 6,587,477 | B1 * | 7/2003 | Takeda et al. | 370/468 |
| 6,745,252 | B1 * | 6/2004 | Yanagawa et al. | 710/8 |
| 6,754,185 | B1 * | 6/2004 | Banerjee et al. | 370/282 |

OTHER PUBLICATIONS

"IEEE 1394-1995 Triple Cable Transreceiver/ Arbiter," Texas Instruments, TSB21LV03, Product Preview, Revision 0.99, Mar. 19, 1996.

"P1394 Standard for a High Performance Serial Bus," IEEE P1394 Draft 8.0v2, Jul. 7, 1995.

Tensolite Company product specification, part No. 20470/9J207X-4(LD).

Tensolite Company product specification, part No. 18480/9J207X-4(LD).

Tensolite Company product specification, part No. 24443/9B048X-4(LD), Jun. 3, 1993.

Tensolite Company product specification, part No. 24443/9C062X-4(LD), Mar. 17, 1993.

Craig Theorin, "High speed serial links benefit from advanced cabling," Oct. 26, 1995.

Raychem specification control drawing, part No. EPD-RWC-13458, Aug. 7, 1995.

Raychem specification control drawing, part No. 82A0111, Sep. 10, 1995, p. 1 of 2.

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316-321.

"Access to High-Speed LAN via Wireless Media" Software Patent Institute, 1995, 1996.

"The IEEE-1394 High Speed Serial Bus," R.H.J. Bloks, Philips Journal of Research, vol. 50, No. 1/2, pp. 209-216, 1996.

P1394a Draft Standard For A High Performance Serial Bus (Supplement), P1394a Draft 2.0 Mar. 15, 1998.

* cited by examiner

PRIOR ART

IEEE 1394-BASED PROTOCOL REPEATER

BACKGROUND OF THE INVENTION

The present invention relates generally to telephone-based interfaces with local area networks, and more particularly to systems and methods for connecting a remote device to a IEEE 1394-based network through a telephone line.

Recent advances in digital bus technology make possible dynamic network connection of a variety of consumer electronic and computing devices. One such bus standard is the IEEE-1394 digital interface standard. The IEEE-1394 digital interface is a serial digital interface enabling high-speed (up to 400 Mbps) data communication among multimedia equipment such as video camcorders, electronic still cameras, computers, and digital audio/visual equipment. Features of the IEEE-1394 interface include automatic configuration supporting "plug and play" and freeform network topology allowing mixing branches and daisy-chains. More complete information regarding IEEE-1394 is available from the Institute of Electrical and Electronics Engineers (IEEE).

Figure 1:
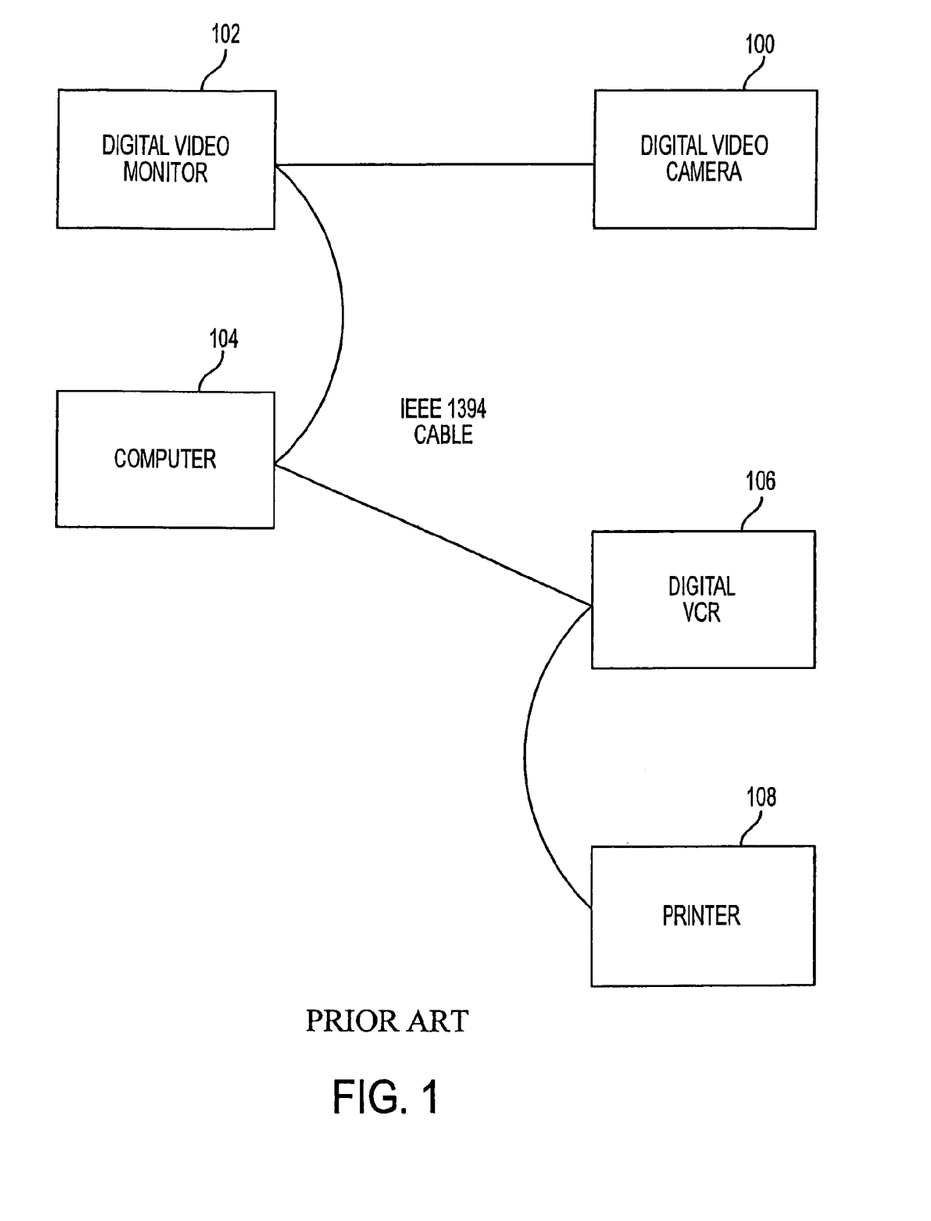
FIG. 1 is a block diagram of a conventional network of devices coupled through an IEEE-1394 bus.

FIG. 1 is a block diagram of a typical network of various multimedia devices (such as consumer electronics and computing devices) coupled through an IEEE-1394 bus. Generally, the IEEE 1394-based network is located in one building, such as a home or an office or some other structure. The exemplary network in FIG. 1 includes digital video camera 100, digital video monitor 102, personal computer 104, digital VCR 106, and printer 108. The IEEE-1394 bus supports communication of digital audio/video data and computer transmission data between the network devices.

The IEEE is currently developing the IEEE-1394.1 standard for bridges. The IEEE 1394.1 bridge generally connects a first IEEE-1394 bus to a second IEEE-1394 bus. The IEEE 1394.1 based bridge serves two purposes. First, it extends distances between the devices in the IEEE 1394 network. Second, it localizes traffic; that is, the bridge is used to isolate high bandwidth traffic to a local area. When used in this second manner, the bridge prevents devices in a local area from knowing that there are other devices on the IEEE 1394-based network. Instead, the devices in the local area will only detect the presence of the IEEE 1394.1 based bridge.

The IEEE 1394.1 bridge is protocol dependent. In other words, devices connected to the bridge must know the bridge protocol to communicate with devices connected to the other side of the bridge. This makes the IEEE 1394.1 based bridge less desirable. In particular, already developed IEEE 1394 devices have no knowledge of the IEEE 1394.1 bridge protocols. As such, these devices will be unable to communicate when connected to the IEEE 1394.1 bridge.

SUMMARY OF THE INVENTION

Systems and methods consistent with the present invention provide remote access to an IEEE 1394 network in the home or other dwelling using, for example, a readily available telephone line. Instead of bridging between traditional IEEE 1394 physical layers, systems and methods consistent with the present invention advantageously provide a connection between a telephone line and a IEEE-1394 bus. In addition, systems and methods consistent with the present invention overcome the above-noted bridge drawbacks by providing a logically transparent connection point.

A system consistent with the present invention includes a protocol repeater for allowing a remote device to access devices in a network of devices coupled through an IEEE-1394 bus. The protocol repeater preferably includes a modem connected to the telephone line and a IEEE-1394 link circuit connected to the 1394-based network. A processor receives the request from the protocol repeater via the modem and transmits the request to the 1394-based network via the IEEE-1394 link circuit.

A method consistent with the present invention connects a remote device to a network of devices coupled through an IEEE-1394 bus. When the protocol repeater receives an incoming telephone call from the remote device, the protocol repeater generates a bus reset of the IEEE-1394 bus in response to the telephone call. Subsequently, the protocol repeater might receive a particular request from the remote device. The protocol repeater transmits the request to the IEEE-1394 network using IEEE-1394 protocols.

Another method consistent with an embodiment of the invention, a method of coupling an IEEE-1394 bus to a remote device using a telephone line connection includes establishing a telephone line connection; receiving a request packet from the IEEE-1394 bus directed to the remote device; determining if the request packet from the IEEE-1394 network is an asynchronous request packet (e.g. a read request packet, a write request packet or a lock request packet) or an isochronous request packet; rejecting the request packet from the IEEE-1394 network if the request packet comprises an isochronous request packet; and transmitting the request packet from the IEEE-1394 network to the remote device via the telephone connection if the request packet comprises an asynchronous request packet.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings:

FIG. 5, including

DETAILED DESCRIPTION OF THE INVENTION

Reference will now be made to the present preferred embodiment of the invention, examples of which are illustrated in the accompanying drawings. Where appropriate, the same reference numerals refer to the same or similar elements. The appended claims define the scope of the invention; the following description does not limit that scope.

Systems and methods consistent with the present invention facilitate communication between an IEEE 1394-based network and a remote device. The remote device may be, for example, another IEEE 1394-based network or a personal computer equipped with a modem. A protocol repeater consistent with the present invention allows the remote device and the IEEE 1394-based network to be transparently connected through a telephone line. In particular, the protocol repeater consistent with the present invention permits a telephone connection to be used as an extension of a IEEE 1394-network, thereby allowing remote devices on the other end of the phone connection to access devices in the IEEE 1394-based network as if they were directly connected.

Figure 2:
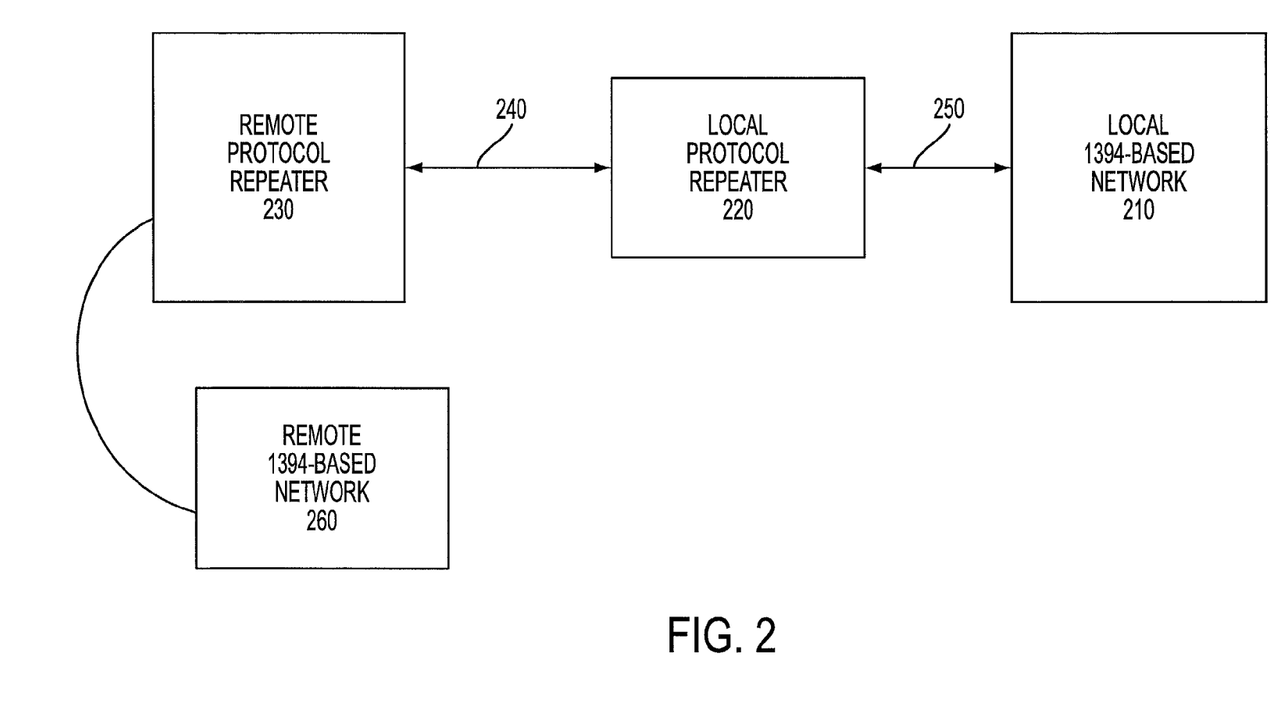
FIG. 2 is a block diagram of a IEEE 1394-based network coupled to a remote device through a telephone line and a protocol repeater consistent with the present invention.

FIG. 2 is a block diagram of a network consistent with the present invention. The network includes remote device 230, telephone line 240, protocol repeater 220, IEEE-1394 interface bus 250, and IEEE 1394-based network 210. As shown, remote device 230 connects to the IEEE 1394-based network 210 through an intervening telephone line 240, protocol repeater 220, and IEEE-1394 bus 250. Using this connection, the remote device 230 can recognize, discover and control devices on the IEEE 1394-based network 210.

Systems and methods consistent with the present invention advantageously provide the ability to phone the IEEE 1394-based network from a remote location and access devices in the IEEE 1394-based network, allowing a remote user to inquire about the state of various devices in the IEEE 1394-based home network. For example, a VCR repairperson could remotely reconfigure the user's digital VCR 106 in network 210. In addition, while at work, the user could program digital VCR 106 to record a favorite show. In yet another example, a ratings entity could remotely determine which programs have been viewed in the home. A multitude of additional beneficial applications result from the use of systems and methods consistent with the present invention.

Protocol repeater 220 converts signals on the telephone line 240 into signals understood by the IEEE 1394-based network 210. Protocol repeater 220 then transmits the signals in IEEE-1394 format to the IEEE 1394-based network via IEEE-1394 bus 250. The protocol repeater 220 is preferably transparent to the remote device 230 (i.e., the remote device 230 thinks that it is directly connected to the IEEE 1394 network.) The remote device 230 may include, for example, a computer with a modem or another IEEE 1394-based network having a connection protocol repeater. One of ordinary skill in the art would appreciate that the remote device could be any device that would allow the user to remotely communicate with a device in the IEEE 1394-based network.

Figure 3:
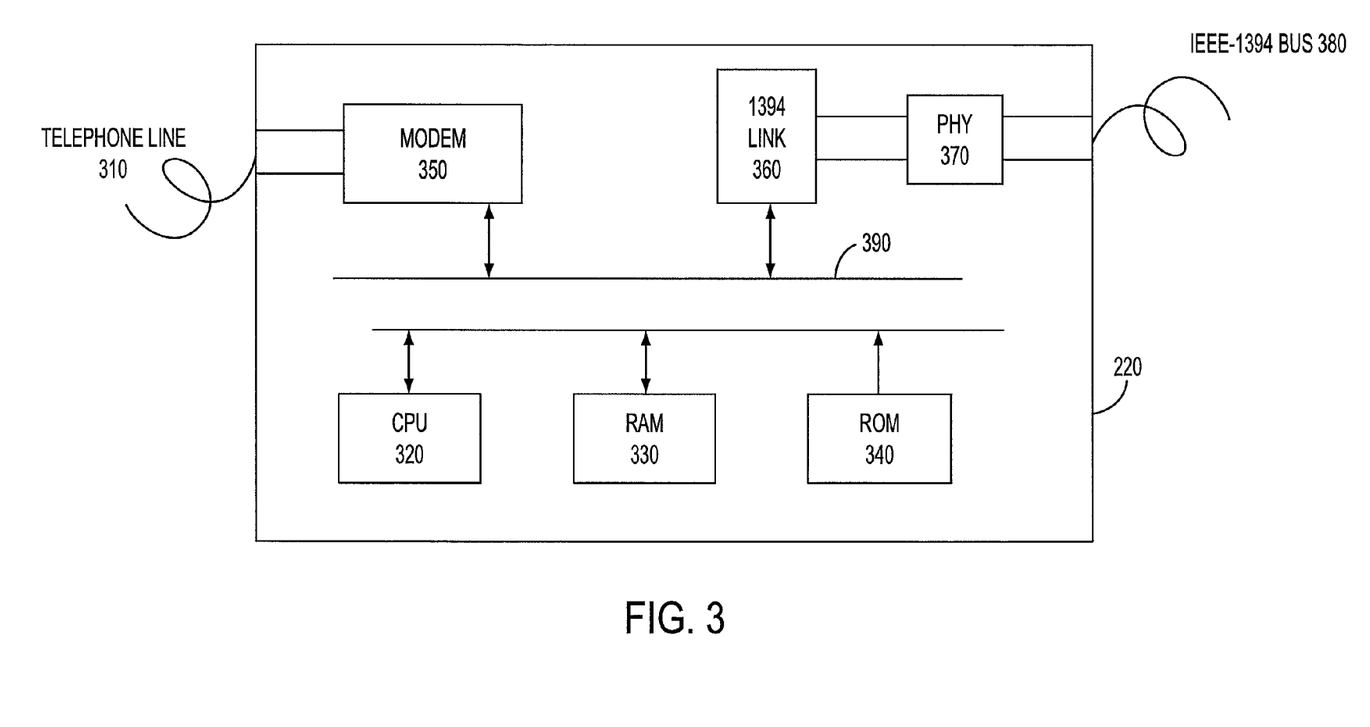
FIG. 3 is a block diagram of a protocol repeater consistent with the present invention.

FIG. 3 is a block diagram of a protocol repeater 220 consistent with the present invention. The protocol repeater 220 is connected to a telephone line 310 at one port and to an IEEE 1394-bus 380 on another port. The protocol repeater 220 includes a modem 350, a Central Processing Unit (CPU) 320, a Random Access Memory (RAM) 330, a Read Only Memory (ROM) 340, a IEEE 1394 link circuit 360, and a physical layer 370, all connected through an internal system bus 390. The protocol repeater 220 is preferably a stand-alone device, although one of ordinary skill in the art would appreciate that the protocol repeater could be built into an IEEE 1394-based network device.

The internal modem 350 connects the telephone line to the internal system bus 390. IEEE 1394 link circuit 360 connects the internal system bus 390 to the IEEE 1394 bus 380. CPU 320 also connects to this internal system bus 390 and thereby controls the operation of the modem and the IEEE 1394 link circuit 360. The ROM 340 holds programming instructions for the CPU 320. The RAM 330 serves as scratchpad space for the CPU 320 as well as an intermediate storage location for data which is passed between the modem 350 and the IEEE 1394 network via the IEEE 1394 link circuit 360. One of ordinary skill in the art would readily appreciate that modem 350 could be implemented external to the protocol repeater 220 and connected using an industry standard serial connection without altering the spirit or function of the present invention.

Figure 4:
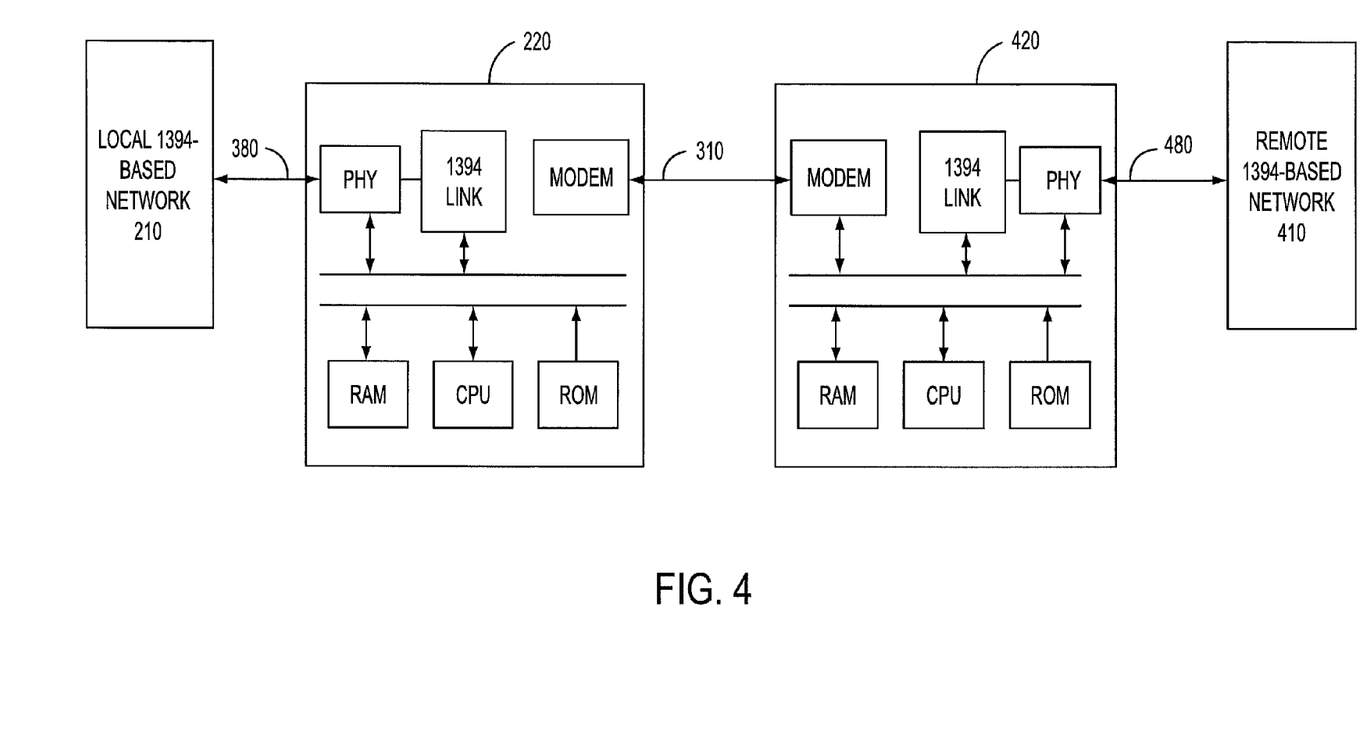
FIG. 4 is a block diagram of a network consistent with the present invention, including two protocol repeaters connecting a local IEEE 1394-based network to a remote IEEE 1394-based network.

FIG. 4 is a block diagram of a network including a local IEEE 1394-based network 210, local protocol repeater 220, remote protocol repeater 420, and a remote IEEE 1394-based network 410. Each network 210 and 410 includes its own protocol repeater 220 and 420 through which the two networks are transparently connected via a telephone line 310. In this embodiment, protocol repeaters 220 and 420 serve as connection points between two IEEE 1394 buses 380 and 480 to effectively make them a single bus. In this manner, devices in the remote network 410 may interact with devices in the local network 210.

Figure 5A:
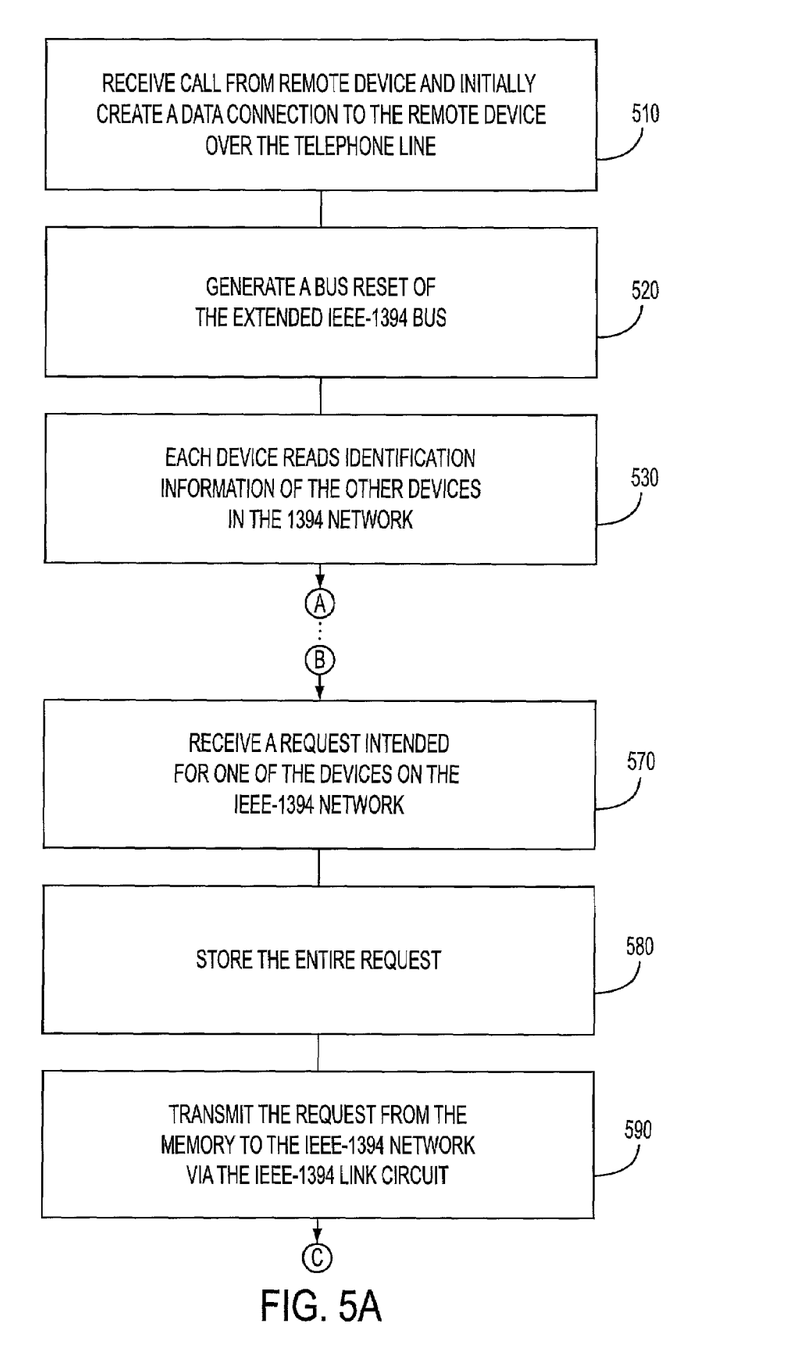
FIG. 5A and FIG. 5B, is a flowchart illustrating a method consistent with the invention for establishing a connection between a IEEE 1394-based network and a remote device.
Figure 5B:
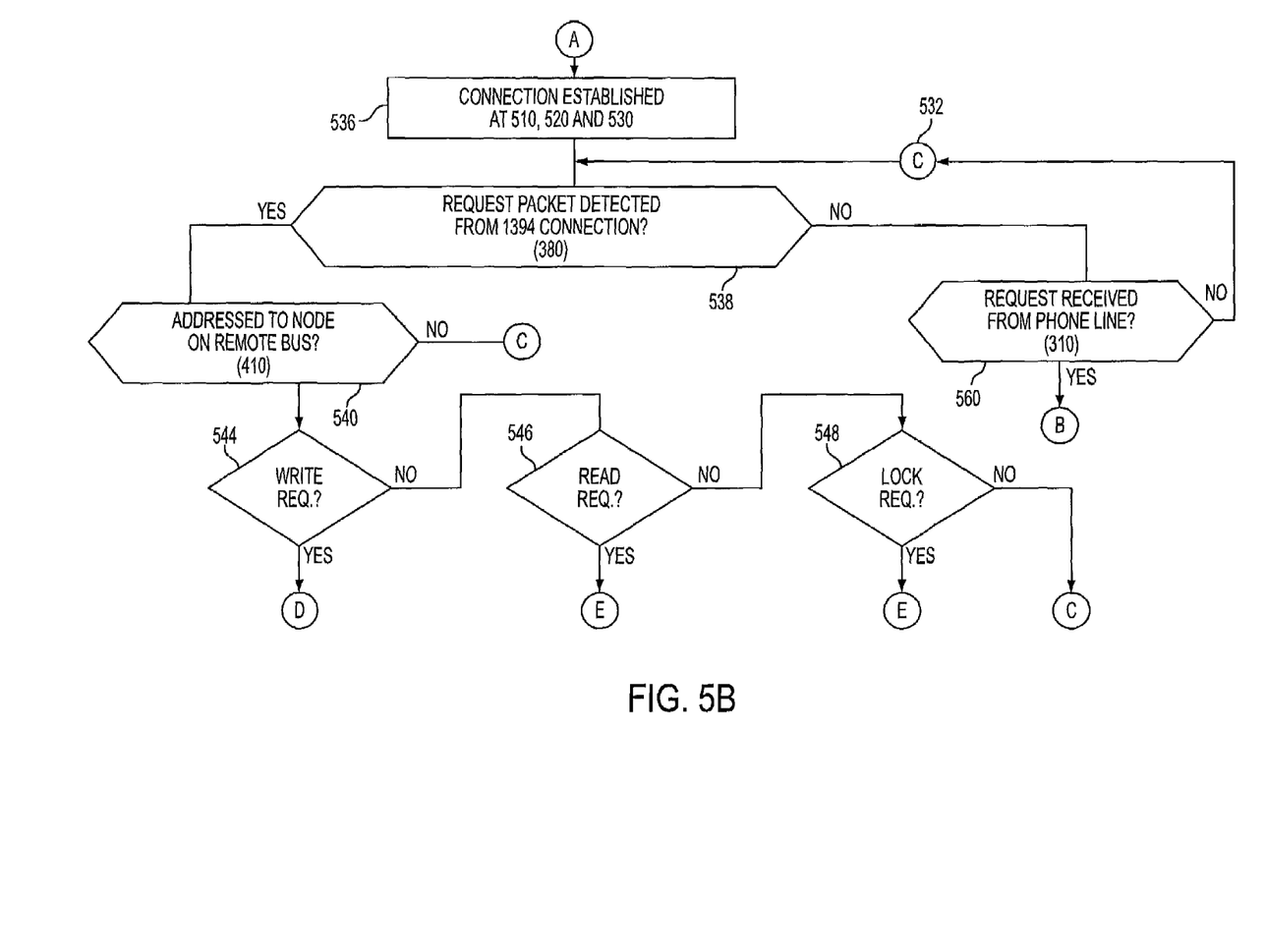

FIG. 5, including FIGS. 5A and 5B, is a flowchart illustrating a method consistent with the present invention for establishing a connection between a local IEEE 1394 network 210 and a remote IEEE 1394 network 410. Referring first to FIG. 5A, an initial connection between the local IEEE 1394 network and the remote IEEE 1394 network is created when the remote network calls in or the IEEE 1394 network calls out (stage 510). The protocol repeaters then generate a bus reset of the "extended" bus, which includes the local IEEE 1394 bus as well as any remote IEEE 1394 buses connected via the telephone line (stage 520). In the bus reset stage, each device in the two IEEE 1394 networks identifies itself to all other IEEE 1394-based devices, including devices on the other network (stage 530). During this bus reset stage, the protocol repeaters facilitate the communication of identification information between the local IEEE 1394 network and the remote IEEE 1394 network. The identification information includes, for example, Tree ID and self ID information, as will be clear to those skilled in the art. The purpose of the bus reset is to provide for true plug-and-play. Actual details of implementation of the bus reset process is outside the scope of this discussion, but will be evident to those having ordinary skill in the art; however, the bus reset process is similar to bus reset processes which have been implemented for wireless or fibre bridge devices.

Figure 6:
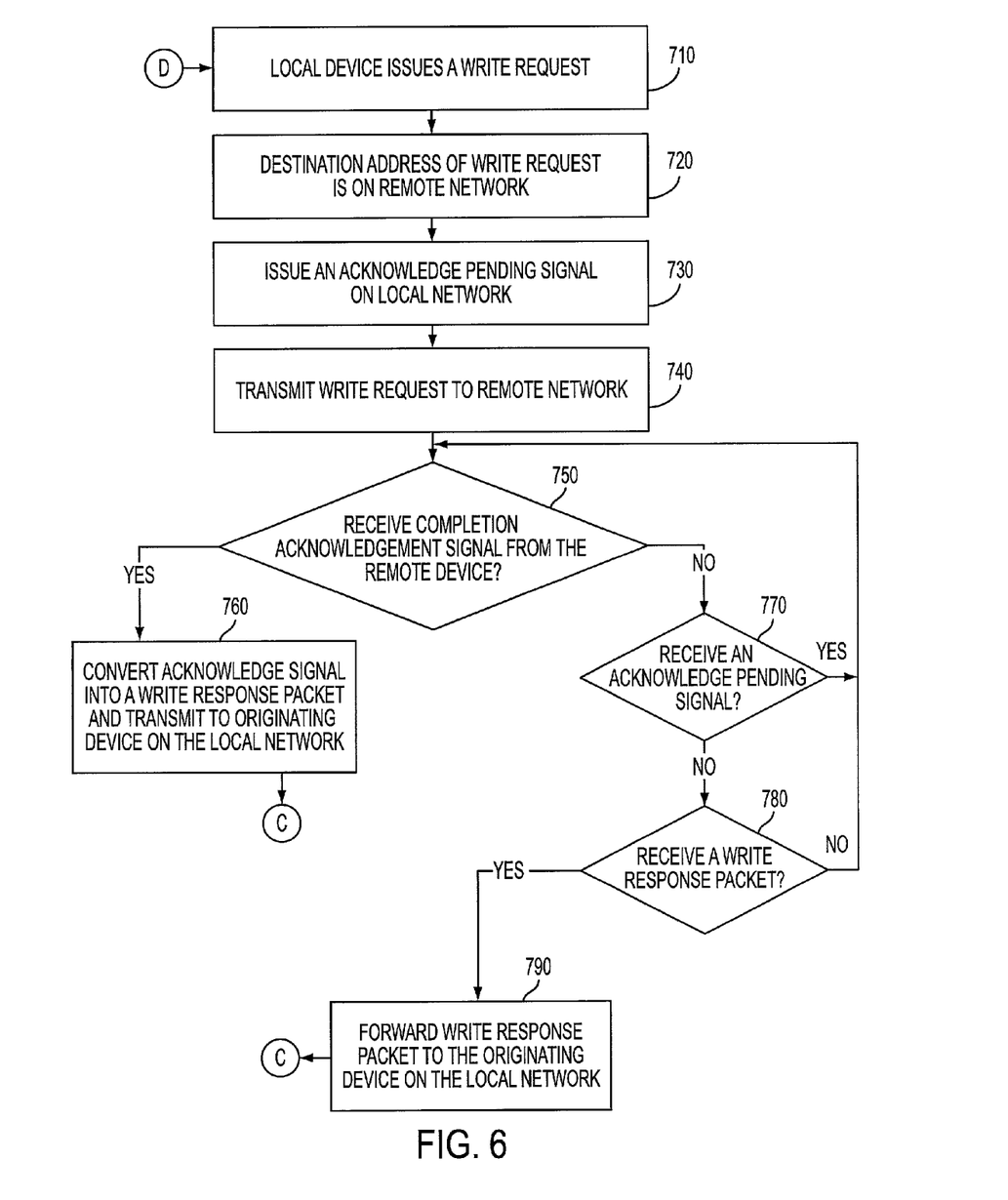
FIG. 6 is a flowchart illustrating a method consistent with the present invention for processing a write request in a manner transparent to both a local IEEE 1394 network and a remote IEEE 1394 network.
Figure 7:
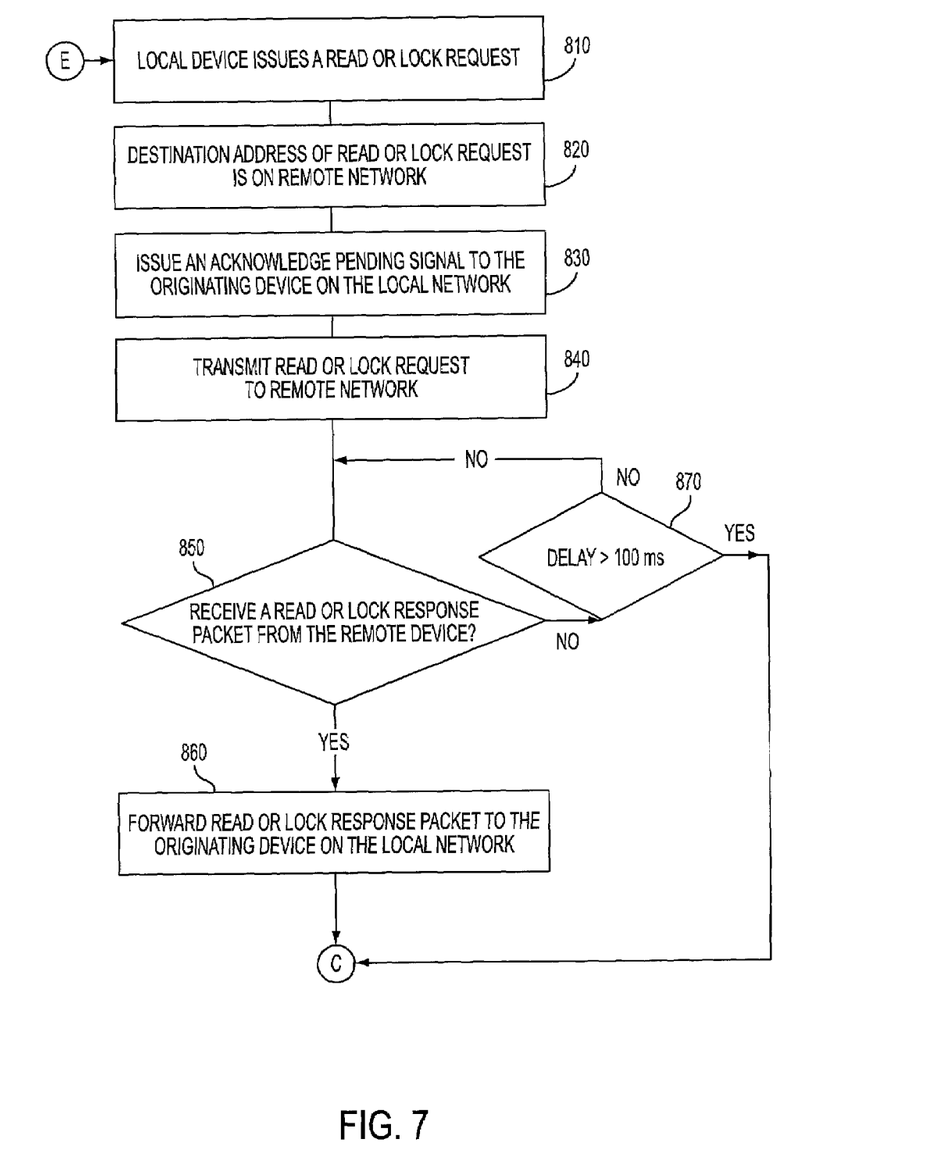
FIG. 7 is a flowchart illustrating a method consistent with the present invention for processing a read request or a lock request in a manner transparent to both a local IEEE 1394 network and a remote IEEE 1394 network.

Referring to FIG. 5B Stages 510, 520 and 530 essentially establish a connection and this process is referenced as 536. Once the connection is established, if a request packet is detected from the 1394 connection (e.g. 380) at 538, the process first determines if the request packet is directed to a node on the remote bus (e.g. 410) at 540. If not, the process returns to a common return point (C) shown as 532. If the request packet is directed to a node on the remote bus at 540, then a decision tree is traversed to determine if the request packet is a write request at 544, a read request at 546 or a lock request at 548. Read requests, write requests and lock requests are the three types of asynchronous requests used in the IEEE 1394 standard. If the request is a write request, the process shown in FIG. 6 is carried out. If the request is a read request at 546 or a lock request at 548, the process shown in FIG. 7 is carried out. If the request is an isochronous request, the request is denied and not passed between the local and remote devices. If the request is none of the above, an error condition is detected and control returns to the return point 532. If at stage 538, no request packet is detected from the 1394 connection, control passes to 560 to determine if the request came from the telephone line. If so, control passes back to stage 570 of FIG. 5A. If not, control returns to the return point 532.

After completion of the bus reset, the local protocol repeater 220 receives a IEEE 1394 request, such as a read or a write request, from the remote IEEE 1394 network 410 through the remote protocol repeater 420. Alternatively, of course, the local IEEE 1394 network 210 could send a read request or a write request through the local protocol repeater 220 to the remote device 410. After receiving the entire request, CPU 320 stores the request in RAM 330 (Stage 580). Because the communications over the IEEE-1394 bus occur at data rates which are substantially faster than the data rates over the telephone connection, the RAM 330 buffers the entire request prior to transmission over the IEEE 1394 network. After reading the request from the RAM 330, the CPU 320 transmits the request to the IEEE 1394-based network through the IEEE 1394 link circuit 360 (stage 590) and the process returns to return point 532.

Each device in the IEEE 1394-based network (and the remote IEEE 1394 network) preferably includes a configuration ROM which stores configuration information. In accordance with the IEEE-1394 standard, every device in the IEEE 1394-based network reads the configuration ROM of every other device during a bus reset. This read operation typically occurs several times throughout the operation of the network as new devices are plugged in and old devices are removed.

In a preferred embodiment, the protocol repeater 220 reads and stores the configuration information in the configuration ROM of the devices in IEEE 1394-based network 210. In the embodiment in FIG. 4, for example, local protocol repeater 220 would store the configuration data for each device in the local network 210 and remote protocol repeater 420 would store the configuration data for each device in the remote network 410. After collecting the configuration information, the protocol repeaters 220 and 420 would preferably exchange the configuration information. In this manner, devices in the local IEEE 1394-based network 210 could access the configuration information corresponding to the devices in the remote IEEE-1394 based network 410 through the protocol repeater 220. Likewise, devices in the remote IEEE 1394-based network 410 could access the configuration information corresponding to the devices in the local IEEE-1394 based network 210 through the protocol repeater 420. Although the stages of capturing and exchanging the configuration information may be time consuming, after completion of these stages, a local network device seeking another device can scan the entire bus (including the remote bus) simply by reading the configuration information stored in the protocol repeater 210. In this manner, the local network device finds the desired device, even if remote, with minimal delay.

Due to the low bandwidth capabilities of traditional telephone lines, high bandwidth isochronous data cannot be transmitted between a remote device and a IEEE 1394-based network using a conventional modem connection. As such, a preferred implementation of the present invention would give preference to asynchronous communications (asynchronous read, write and lock requests and associated communication) between the remote device and the local IEEE 1394-based network. One of ordinary skill in the art would appreciate that, with the addition of technology capable of providing higher bandwidth connections than that available with current modems, it may be possible to enhance the function of the protocol repeater 220 to include isochronous capabilities, provided the remote device 230 also implements complementary technologies to realize the higher bandwidth connection.

In the preferred embodiment, no isochronous traffic is forwarded from the remote network to local network and from local network to remote network through the telephone line. In particular, the protocol repeater 220 consistent with the present invention preferably employs techniques to assure that bandwidth capabilities are not exceeded. For example, the logically transparent protocol repeater 210 may prevent the network devices from requesting operations that are not available through the protocol repeater 210. In addition, the protocol repeater may inform the local network devices and the remote device that the intervening connection is incapable of transmitting high bandwidth data. For example, when a device in the remote IEEE 1394-based network 410 attempts to retrieve high definition television signals from a device in local IEEE 1394-based network 210, the protocol repeater 420 preferably sends an error message, indicating to the remote device that the requested operation is not available.

As described in FIGS. 5A and 5B, the present invention ensures that network devices do not exceed certain bandwidth capabilities. To summarize, first the protocol repeater determines if the request is directed to a device on the local IEEE 1394 network or a device located on the remote IEEE 1394 network. If the request is directed to a device on the remote network, the protocol repeater determines whether the packet data is isochronous or asynchronous. The protocol repeater 220 forwards all asynchronous packets to the remote network before returning control to return point 532. On the other hand, the protocol repeater 220 does not transmit isochronous packets to the remote IEEE 1394 network. This is because, in this embodiment, the protocol repeater 220 only transmits asynchronous data on the telephone line between the IEEE 1394-based network and the remote device. After rejecting the isochronous connection, control returns to return point 532. Of course, in the case where the request is directed to a device on the local network, the protocol repeater forwards both asynchronous and isochronous packets before returning to return point 532.

The operation of the protocol repeater 220 is transparent to the other devices in the IEEE 1394-based network. In this regard, the protocol repeater 220 acts as proxy for the remote device 230. FIGS. 6 and 7 are flowcharts illustrating how a protocol repeater consistent with the present invention acts as a proxy for the remote device 230. As a proxy, the protocol repeater 220 advantageously allows the remote device 230 to communicate with the local IEEE 1394-based network 210, even if the remote device 230 is unfamiliar with the bridge protocol. Specifically, the protocol repeater 220 automatically converts received requests into IEEE 1394 format and forwards the converted requests to the local network. In this manner, the protocol repeater is transparent to the remote device.

FIG. 6 illustrates the method for processing a write request in a manner transparent to both the local IEEE 1394 network and the remote IEEE 1394 network. First, one of the devices on the local IEEE 1394-based network 210 issues a write request (stage 710). The protocol repeater 220 determines that the destination address of that write request is on the remote network 410 (stage 720). Immediately thereafter, the protocol repeater 220 on the local network issues an acknowledge pending signal to the local IEEE 1394 network 210 to notify the local network 210 that the write transaction needs more time to be completed (stage 730). The protocol repeater 220 captures the write request packet (e.g., stores it in RAM 330) and sends it via the telephone line to the remote IEEE 1394-based network 410 (stage 740). In accordance with the method illustrated in FIG. 5, the protocol repeater 420 on remote IEEE 1394-based network 410 then recreates the write request packet from the local IEEE 1394-based network 210 and transmits that request in IEEE 1394 format to the designated device on the remote network 420.

Upon receipt of the write request, the device on the remote network 420 preferably will take one of two possible actions. In the first scenario, the device on remote network 420 issues an acknowledge complete signal indicating that the write request is completed. The acknowledge complete signal is forwarded through protocol repeaters 420 and 220 to the local IEEE 1394-based network 210. Protocol repeater 220 on local IEEE 1394-based network 210 converts the acknowledge complete signal into a write response packet (stage 760). The write response packet is then transmitted to the originating device on the local network 210 and control returns to return point 532.

In the second scenario, the device on remote network 410 issues an acknowledge pending signal, indicating that the write request will take additional time to complete (stage 770). The local protocol repeater 220 takes no action in response to this signal (because, as noted, the local protocol 220 repeater has already sent an acknowledge pending signal to the local device). At some later time, the device on the remote network 410 sends a write response packet, which is forwarded over the telephone line through the remote protocol repeater 420 to the local protocol repeater 220 (stage 780). The protocol repeater 220 on the local IEEE 1394-based network 210 forwards the write response packet back to the originating device on the local network 210 (stage 790) and control returns to the return point 532. The originating device on the local network 210 then typically issues an acknowledge complete signal, which is transmitted to the remote network 410 by the protocol repeaters 220 and 420.

FIG. 7 illustrates the method for processing a read request or a lock request in a manner transparent to both the local IEEE 1394 network and the remote IEEE 1394 network. First, a device in the local network 210 sends a read request or lock request to the local protocol repeater (stage 810). The protocol repeater 220 determines that the destination address of the read request or lock request is on the remote IEEE 1394 -based network (stage 820). Immediately thereafter, the protocol repeater 220 issues an acknowledge pending signal to the local IEEE 1394 network to notify the network that the read or lock transaction needs more time to be completed (stage 830). The protocol repeater 220 then captures the read request or lock request packet and sends it via the telephone line to the remote IEEE 1394-based network (stage 840). When the device on the remote network receives the request, it issues a read response or lock response packet, which is transmitted back to the local device through the two protocol repeaters (stages 850 and 860). If a read response packet or lock response packet is not received from the remote device within 100 milliseconds (stage 870), nothing is forwarded (stage 860 is bypassed) and the process returns to the return point 532 (C). Stage 860 also terminates with return to the return point 532.

As noted, in one embodiment, the signal on the telephone line is preferably an analog signal of the type created by modem technology. However, one of ordinary skill in the art would appreciate that the present invention is operable with higher speed connections, such as digital cable with a digital subscriber lines (DSL) or integrated services digital network (ISDN). Similarly, one of ordinary skill in the art would understand that although one embodiment shows a modem, the invention is not limited to modems and could employ higher speed connections, such as DSL or ISDN or digital cable. With higher speed video services, the remote device and the IEEE 1394-based network would interchange isochronous audio/video data.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A protocol repeater for allowing a remote device to access a network having devices coupled through an IEEE-1394 bus, comprising:
   a modem connected to a telephone line to receive a request directed to a device in the IEEE 1394-based network from the remote device;
   an interface connected to the IEEE 1394-based network;
   a processor to receive the request from the modem and transmit the request to the IEEE 1394-based network via the interface using IEEE-1394 protocol, wherein the processor further receives requests from the interface and transmits the requests from the interface to a remote device via the modem; and
   means for determining if a request packet from the interface is destined for a remote bus and if so, means for determining if the request packet is of a type which exceeds bandwidth capabilities of the modem, and if so rejecting the request packet.

2. The protocol repeater of claim 1, further comprising a memory to store configuration information corresponding to at least one device in the IEEE 1394-based network.

3. The protocol repeater of claim 1, wherein if the means for determining determines that a request packet from the interface is destined for a remote bus, then the means for determining also determines if the request packet from the interface is one of a read request packet, a write request packet and a lock request packet.

4. The protocol repeater of claim 3, further comprising means for transmitting the request packet from the interface to the remote device via the modem if the request packet comprises one of a read request packet, a write request packet and a lock request packet.

5. A protocol repeater for allowing a remote device to access a network having devices coupled through an IEEE-1394 bus, comprising:

a modem connected to a telephone line to receive a request directed to a device in the IEEE 1394-based network from the remote device;

an interface connected to the IEEE 1394-based network;

a processor to receive the request from the modem and transmit the request to the IEEE 1394-based network via the interface using IEEE-1394 protocol, wherein the processor further receives requests from the interface and transmits the requests from the interface to a remote device via the modem; and means for rejecting the request packet from the interface if the request packet comprises an isochronous request packet.

6. A protocol repeater for allowing a remote device to access a network having devices coupled through an IEEE-1394 bus, comprising:

a modem means connected to a telephone line for receiving a request directed to a device in the IEEE-1394 network from the remote device;

an interface means connected to the IEEE 1394-based network;

a processor means for receiving the request from the modem means and transmitting the request to the IEEE 1394-based network via the interface means using IEEE-1394 protocol; and means for ensuring that data transmitted over the telephone line does not exceed the bandwidth capabilities of the telephone line.

7. The protocol repeater of claim 6, further comprising:

a memory to store configuration information corresponding to at least one device in the IEEE 1394-based network.

8. The protocol repeater of claim 6, wherein the processor further receives requests from the interface and transmits the requests from the interface to a remote device via the modem.

9. The protocol repeater of claim 8, further comprising means for determining if a request packet from the interface is destined for a remote bus and if so, means for determining if the request packet from the interface one of a read request packet, a write request packet and a lock request packet.

10. The protocol repeater of claim 9, further comprising means for transmitting the request packet from the interface to the remote device via the modem if the request packet comprises one of a read request packet, a write request packet and a lock request packet.

11. A protocol repeater for allowing a remote device to access a network having devices coupled through an IEEE-1394 bus comprising;

a modem means connected to a telephone line for receiving a request directed to a device in the IEEE-1394 network from the remote device;

an interface means connected to the IEEE 1394-based network;

a processor means for receiving the request from the modem means and transmitting the request to the IEEE 1394-based network via the interface means using IEEE-1394 protocol, wherein the processor further receives requests from the interface and transmits the requests from the interface to a remote device via the modem; and means for rejecting the request packet from the interface if the request packet comprises an isochronous request packet.

12. A method of employing a telephone line to connect a remote device to a network having devices coupled through an IEEE-1394 bus comprising:

receiving an incoming telephone call from the remote device;

generating a bus reset of the IEEE-1394 bus in response to the telephone call;

receiving from the remote device a request directed to a device in the IEEE-1394 network;

transmitting the request to the IEEE-1394 network using IEEE-1394 protocols; and rejecting the request packet from the IEEE-1394 network if the request packet comprises an isochronous request packet.

13. The method of claim 12, further comprising receiving requests from the interface and transmitting the requests from the interface to a remote device via a modem.

14. The method of claim 12, further comprising determining if a request packet from the IEEE-1394 network is destined for a remote device and if so, determining if the request packet from the IEEE-1394 network is one of a read request packet, a write request packet and a lock request packet.

15. The method of claim 14, further comprising transmitting the request packet from the IEEE-1394 network to the remote device via a modem if the request packet comprises one of a read request packet, a write request packet and a lock request packet.

16. A method of coupling an IEEE-1394 bus to a remote device using a telephone line connection, comprising:

establishing a telephone line connection;

receiving a request packet from the IEEE-1394 bus directed to the remote device;

determining if the request packet from the IEEE-1394 network is one of an asynchronous request packet and an isochronous request packet;

rejecting the request packet from the IEEE-1394 network if the request packet comprises an isochronous request packet; and transmitting the request packet from the IEEE-1394 network to the remote device via the telephone connection if the request packet comprises an asynchronous request packet.

17. The method of claim 16, wherein the asynchronous request packet comprises one of a read request packet, a write request packet and a lock request packet.

18. The method of claim 16, further comprising receiving requests from the remote device and transmitting the requests from the remote device to the IEEE-1394 network.

* * * * *